(12) United States Patent
Coat et al.

(10) Patent No.: US 11,807,376 B2
(45) Date of Patent: Nov. 7, 2023

(54) METHOD FOR RATING A PROPULSION UNIT COMPRISING A MAIN ENGINE AND AN AUXILIARY ENGINE

(71) Applicant: SAFRAN AIRCRAFT ENGINES, Paris (FR)

(72) Inventors: Pascal Charles Edouard Coat, Moissy-Cramayel (FR); Jean-François Endy Bersot, Moissy-Cramayel (FR); Stephane Orcel, Moissy-Cramayel (FR); Nicolas Jerome Jean Tantot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 371 days.

(21) Appl. No.: 15/776,593

(22) PCT Filed: Nov. 16, 2016

(86) PCT No.: PCT/FR2016/052978
§ 371 (c)(1),
(2) Date: May 16, 2018

(87) PCT Pub. No.: WO2017/085405
PCT Pub. Date: May 26, 2017

(65) Prior Publication Data
US 2018/0370644 A1 Dec. 27, 2018

(30) Foreign Application Priority Data
Nov. 16, 2015 (FR) ...................................... 1561000

(51) Int. Cl.
*B64D 31/00* (2006.01)
*B64D 27/00* (2006.01)
(Continued)

(52) U.S. Cl.
CPC .............. *B64D 31/00* (2013.01); *B64D 27/00* (2013.01); *B64D 27/10* (2013.01); *B64D 27/16* (2013.01);
(Continued)

(58) Field of Classification Search
CPC ................................ B64D 31/00; B64D 27/00
(Continued)

(56) References Cited

U.S. PATENT DOCUMENTS 3,002,710 A   10/1961   Marchetti et al.
3,963,372 A   6/1976   McLain et al.
(Continued)

FOREIGN PATENT DOCUMENTS

EP   2 508 735   10/2012
EP   2 735 508   5/2014
(Continued)

OTHER PUBLICATIONS

International Search Report for PCT/FR2016/052978 dated Feb. 10, 2017 [PCT/ISA/210].
(Continued)

*Primary Examiner* — Christopher P Ellis
(74) *Attorney, Agent, or Firm* — Sughrue Mion, PLLC

(57) ABSTRACT

The invention relates to the rating (S) of a propulsion unit (2) comprising a main engine (3) providing main thrust assisted by an auxiliary engine (4) providing auxiliary thrust, according to the following steps: (i) determining (S1) a distribution between the main thrust and the auxiliary thrust so as to obtain the takeoff thrust of the propulsion unit, the auxiliary thrust making a 5% to 65% contribution to the takeoff thrust, (ii) depending on the distribution determined for the takeoff condition, determining (S2) distribution between the main thrust and the auxiliary thrust so its to obtain the top of climb thrust of the propulsion unit, the auxiliary thrust making at
(Continued)

Figure 1:
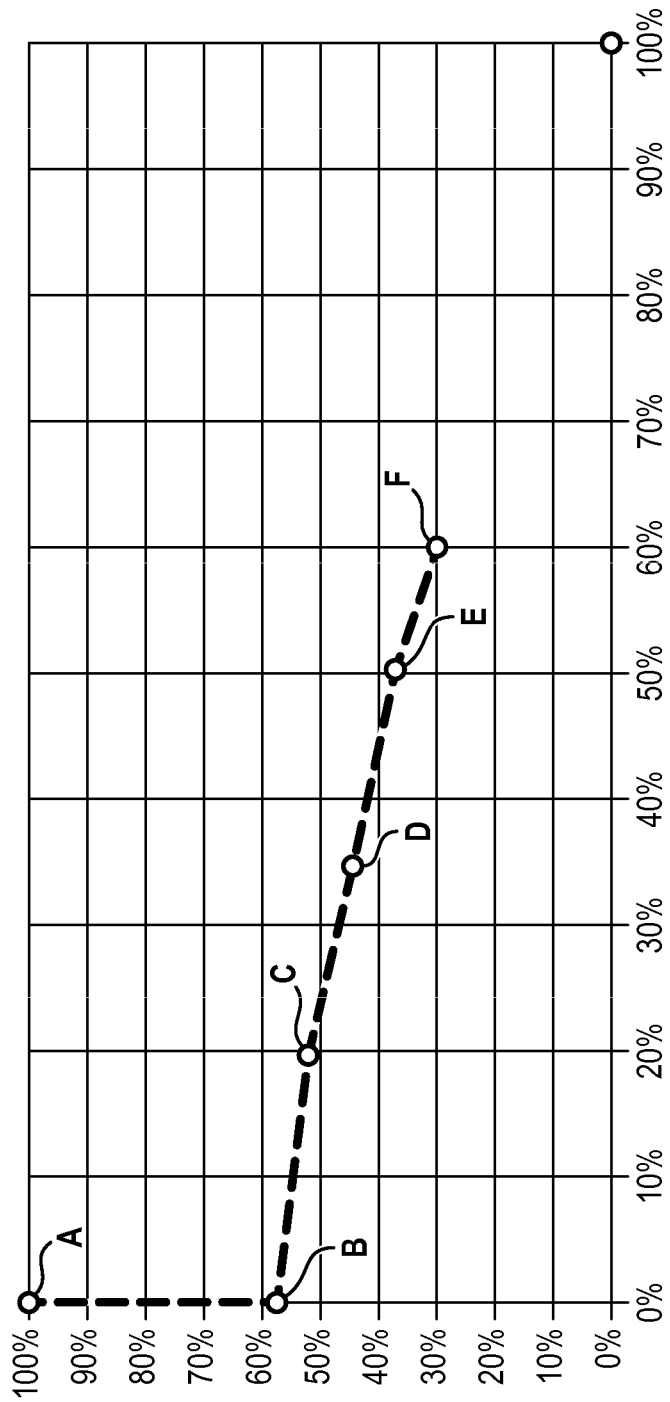

most 70% contribution to the top of climb thrust, and (iii) rating (S3) the propulsion unit (2) in such a way that the main thrust of the main engine (3) determined fir the takeoff condition corresponds to the maximum thrust likely to be achieved by the main engine (3).

14 Claims, 3 Drawing Sheets

(51) Int. Cl.
  *B64D 27/10*   (2006.01)
  *B64D 27/16*   (2006.01)
  *B64D 27/24*   (2006.01)
  *B64D 27/02*   (2006.01)

(52) U.S. Cl.
  CPC ........ B64D 27/24 (2013.01); *B64D 2027/026* (2013.01)

(58) Field of Classification Search
  USPC ........................................................ 244/53 R
  See application file for complete search history.

(56) References Cited

U.S. PATENT DOCUMENTS

| | | | |
|---|---|---|---|
| 4,177,693 A | 12/1979 | Ivanko et al. | |
| 9,890,708 B2 * | 2/2018 | Borchers | F02C 6/02 |
| 10,059,460 B2 * | 8/2018 | Dauriac | F02C 7/277 |
| 10,144,528 B2 * | 12/2018 | Rossotto | B64C 27/12 |
| 2009/0186320 A1 | 7/2009 | Rucci et al. | |

FOREIGN PATENT DOCUMENTS

| | | |
|---|---|---|
| EP | 2 735 512 | 5/2014 |
| FR | 1 006 380 | 4/1952 |
| FR | 1 055 264 | 2/1954 |
| FR | 2 784 960 | 4/2000 |
| FR | 2933910 A1 | 1/2010 |
| WO | 95/27654 | 10/1995 |
| WO | 2010/041939 | 4/2010 |

OTHER PUBLICATIONS

Search Report dated Jul. 5, 2016 from the French Patent Office in counterpart application No. FR1561000.
Written Opinion dated Nov. 16, 2015 from the French Patent Office in counterpart application No. FR1561000.
International Search Report and Written Opinion dated Feb. 10, 2017 from the International Bureau in counterpart International application No. PCT/FR2016/052978.

* cited by examiner

METHOD FOR RATING A PROPULSION UNIT COMPRISING A MAIN ENGINE AND AN AUXILIARY ENGINE

CROSS REFERENCE TO RELATED APPLICATIONS

This application is a National Stage of International Application No. PCT/FR2016/052978 filed on Nov. 16, 2016, which claims priority based on French Patent Application No. 1561000 filed on Nov. 16, 2015, the disclosures of each of which are incorporated by reference herein in their entirety.

FIELD OF THE INVENTION

The invention relates to the general field of aircraft, and more particularly of the rating of engines of such aircraft with a view to improving, inter alia, the specific consumption. The invention applies to all the types of aircraft intended to fly missions comprising different operating conditions.

TECHNOLOGICAL BACKGROUND

When operating, a given engine is stressed in various ways according to the flight phases of the aircraft. In fact, each phase flight is associated with an engine operating condition, including ground idle, take off, climb, top of climb (or maximum climb) or also cruise. During the above operating conditions, the engine is maintained over a relatively long time (between thirty seconds for take off and several hours for cruise) at predefined speed ranges which depend on the redlines of the engine (specifically the absolute maxima encountered by the operating parameters of the engine such as engine speed of the shafts or the temperature of the various hot parts of the engine, throughout the flight).

The most restricting operating condition of the engine in terms of thrust is generally take off. This is usually why the engines for aircraft are rated as a function of this operating condition to ensure their capacity to have the aircraft take off. For this, engines are rated so as to function at maximal temperatures at input and output of the combustion chamber during the take off phase, so that the efficiency of the thermodynamic (and therefore energetic) cycle of the engine is optimal during this phase. These input and output temperatures of the combustion chamber will directly condition the size of the high-pressure parts of the engine (high-pressure compressor, combustion chamber and high-pressure turbine) as well as their constituent material so that they can provide the necessary thrust at take off of the aircraft.

But the length of the take off phase is very short (between around one and five minutes, according to the types of aircraft and their mission) compared to the other flight phases. Throughout most of the flight, it eventuates that the engine needs lower thrust and therefore exhibits less thermodynamic (and therefore energetic) efficiency. This is especially the case for cruise, which generally lasts at least thirty minutes. In fact, during cruise, the power required by the engine is lower than during take off. The drop in engine power is achieved by reducing the temperature at output of the combustion chamber and therefore at input of the high-pressure turbine of the engine, involving a reduction in the overall compression ratio. The result of this during this flight phase is that the specific consumption of the engine is greater than its optimum.

Currently, to respect growing regulatory restrictions (in terms of acoustics and pollutant emission especially) and to reduce engine operating costs, especially linked to their specific consumption, engine manufacturers tend to increase the input and output temperature of combustion chambers to reduce the size of high-pressure bodies of engines and increase the size of the low-pressure body and maintain fan diameters acceptable for aircraft manufacturers. Such a rise in input and output temperature of the combustion chamber does in fact improve the efficiency of the thermodynamic cycle of engines, to the extent where the overall compression ratio and the input temperature of the high-pressure turbine increase. This effectively improves thermodynamic efficiency in the take off phase, which is the rating phase. But thermodynamic efficiency in the other flight phases is not optimal, especially at cruise speed.

Engine manufacturers therefore look for a compromise between the needs of the engine as per the different operating conditions and the impact of these constraints in terms of specific consumption, mass, acoustic constraints, etc.

SUMMARY OF THE INVENTION

An aim of the invention is therefore to propose a solution in the field of aircraft propulsion responding to this problem of conciliation of operational restrictions, such as the capacity of the propulsion unit to have an aircraft take off, with ambitious fuel consumption goals, typical of civil commercial aviation.

For this, the invention proposes a rating process of a propulsion unit for an aircraft, said propulsion unit being configured to operate in at least two distinct operating conditions and comprising:
  at least one main engine, configured to provide main thrust, and
  at least one auxiliary engine, distinct from the main engine and configured to provide auxiliary thrust, during the take off phase and as far as top of climb,
Ie rating process being characterised in that it comprises the following steps:
  (i) for a first operating condition corresponding to the take off phase and first thrust of the propulsion unit, determine a first split between the main thrust and the auxiliary thrust to obtain said first thrust, the auxiliary thrust participating in at least 5% and at most 65% of the first thrust,
  (ii) for a second operating condition corresponding to the top of climb and to a second thrust of the propulsion unit, determine a second split between the main thrust and the auxiliary thrust to obtain said second thrust, this second split being a function of the first determined split, the auxiliary thrust participating in at most 70% of the second thrust, and
  (iii) rate said propulsion unit such that the main thrust of the main engine determined for the first operating condition corresponds to the maximal thrust likely to be achieved by the main engine irrespective of the operating condition of the propulsion unit.

Some preferred, though non-limiting, characteristics of the rating process described above are the following, taken individually or in combination:
  the first and the second split between the main thrust and the secondary thrust are determined, close to 2%, from the following operating ranges: the auxiliary thrust participates at most 45% of the first thrust for the first operating condition and the main thrust participates at 100% of the second thrust for the second operating condition; or the auxiliary thrust participates at 45% to 48% of the first thrust for the first operating condition and at 0% to 20% of the second thrust for the second operating condition; or the auxiliary thrust participates at 48% to 55% of the first thrust for the first operating condition and at 20% to 35% of the second thrust for the second operating condition; or the auxiliary thrust participates at 55% to 63% of the first thrust for the first operating condition and at 35% to 50% of the second thrust for the second operating condition; or the auxiliary thrust participates at 63% to 70% of the first thrust for the first operating condition and at 50% to 60% of the second thrust for the second operating condition;

the first and the second split between the main thrust and the secondary thrust are determined, close to 2%, from the following operating ranges: the auxiliary thrust participates at 38% to 42% of the first thrust for the first operating condition and the main thrust participates at 100% of the second thrust for the second operating condition; or the auxiliary thrust participates at 47% to 49% of the first thrust for the first operating condition and at 18% to 21% of the second thrust for the second operating condition; or the auxiliary thrust participates at 52% to 55% of the first thrust for the first operating condition and at 33% to 36% of the second thrust for the second operating condition; or the auxiliary thrust participates at 60% to 63% of the first thrust for the first operating condition and at 49% to 52% of the second thrust for the second operating condition, the first operating condition corresponds to the take off and the second operating condition corresponds to the top of climb, According to a second aspect, the invention also proposes a propulsion unit for an aircraft configured to operate at least at one distinct first and a second operating condition and comprising:

at least one main engine, configured to provide main thrust, and at least one auxiliary engine, distinct from the main engine and configured to provide auxiliary thrust, said propulsion unit being rated in keeping with a rating process as described above, such that the main thrust of the main engine during the first operating condition corresponds to the maximal thrust likely to be achieved by the main engine irrespective of the operating condition.

Some preferred but non-limiting characteristics of the propulsion unit described above are the following, taken individually or in combination:

the main engine comprises one or more turbojets or one and/or more turboprops, the auxiliary engine comprises one or more turbojets and/or one or more turboprops and/or one or more propulsion effectors with electric engines, and/or the auxiliary engine is retractable.

According to a third aspect, the invention proposes an aircraft comprising a propulsion unit as described above.

Optionally, the aircraft can comprise at least two auxiliary engines, the thrust of said auxiliary engines participating at 100% of the auxiliary thrust.

BRIEF DESCRIPTION OF THE DIAGRAMS

Figure 2:
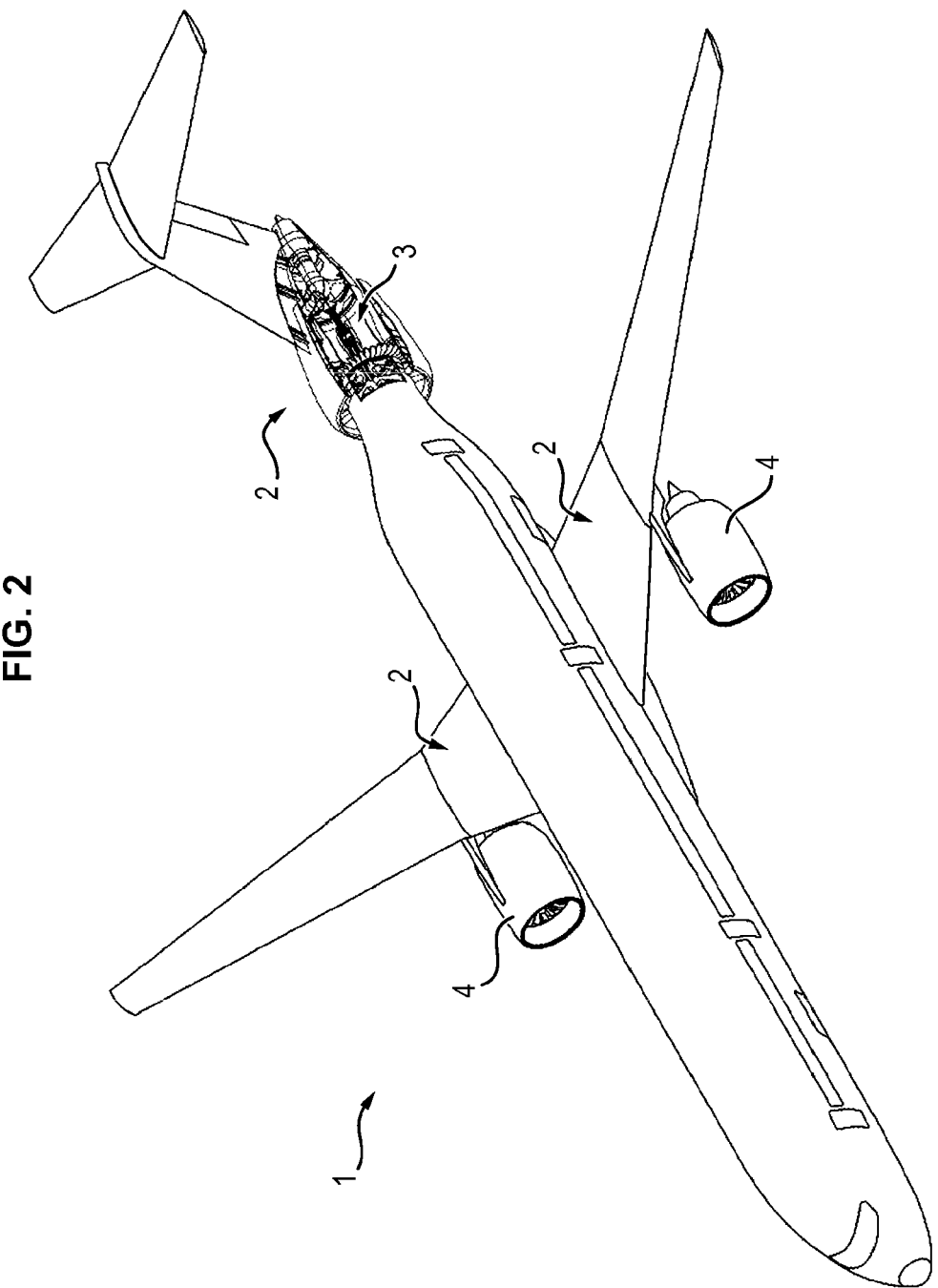
Figure 3:
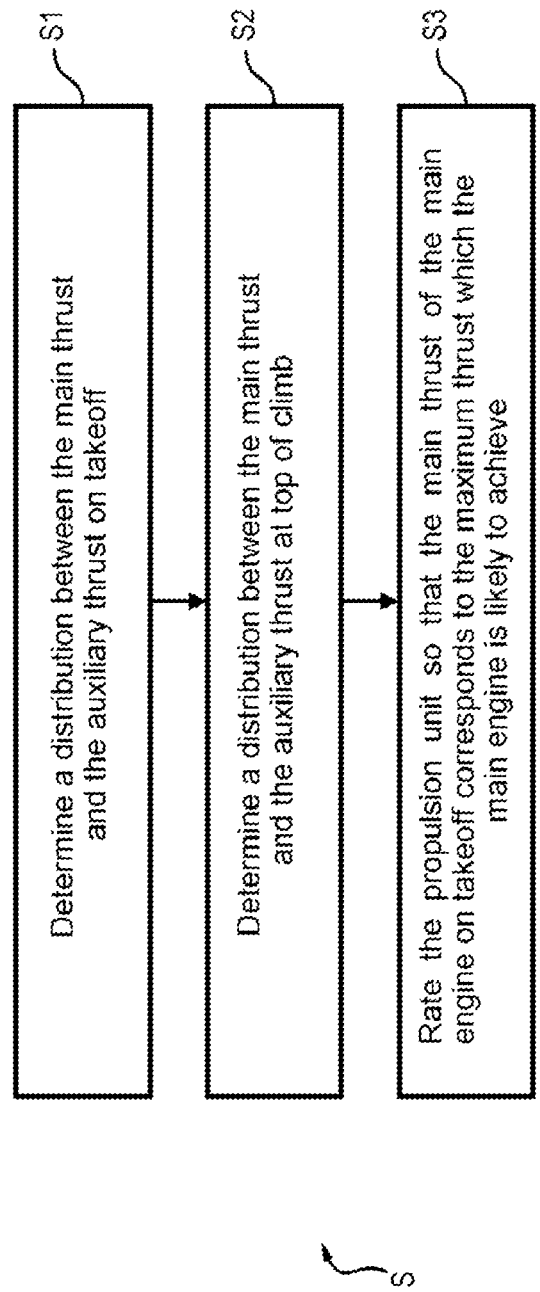

Other characteristics, aims and advantages of the present invention will emerge from the following detailed description and with respect to the appended drawings given by way of non-limiting examples and in which:

FIG. 1 is a graphic illustrating examples of rating points for operating conditions corresponding to take off and top of climb of a propulsion unit according to the invention, in which the Y-axis represents the percentage of the total thrust of the propulsion unit made by the main engine at take off and the axis of abscissa represents the percentage of the total thrust of the propulsion unit made by the auxiliary engine of the propulsion unit at top of climb, FIG. 2 illustrates an embodiment of an aircraft which can comprise a propulsion unit according to the invention, and FIG. 3 is a flowchart illustrating steps of an example of a rating process of a propulsion unit according to the invention.

DETAILED DESCRIPTION OF AN EMBODIMENT

To improve the specific consumption of a propulsion unit 2 for an aircraft 1 comprising a main engine 3, the invention proposes freeing the main engine 3 form the restriction of being be capable of providing sufficient thrust for have the aircraft 1 take off and add to the propulsion unit 2 an auxiliary engine 4, distinct from the main engine 3, to compensate the loss of thrust linked to this modification of the main engine 3. It becomes possible to rate the main engine 3 by significantly improving its specific consumption in the flight phases of considerable length, such as cruise, while ensuring that the propulsion unit 2 is capable of having the aircraft 1 take off.

For this, the propulsion unit 2 is configured to operate at at least two distinct operating conditions and comprises at least one main engine 3 and an auxiliary engine 4. These two engines contribute to the total thrust delivered by the propulsion unit, in different thrust percentages according to the flight phases. Main engine here and throughout the present text means an engine configured to provide thrust during all the different flight phases and in particular during the cruise phase for providing thrust which contributes mainly to total thrust. Auxiliary engine means an engine which assists the main engine in providing auxiliary thrust during some flight phases (during the take off phase and until top of climb, especially). The auxiliary engine is preferably cut off during flight phases needing less total thrust, such as cruise phase; during these phases it can also operate on idle or at low thrust.

This propulsion unit 2 is rated according to the following steps:

(i) for a first operating condition corresponding to first thrust of the propulsion unit 2, determine (step S1) a first split between the main thrust and the auxiliary thrust to obtain said first thrust, the auxiliary thrust participating in at least 5% and at most 65% of the first thrust, (ii) for a second operating condition corresponding to a second thrust of the propulsion unit 2 and as a function of the first determined split for the first operating condition, determine (step S2) a second split between the main thrust and the auxiliary thrust to obtain said second thrust, the auxiliary thrust participating in at most 70% of the second thrust, and (iii) rate (step S3) said propulsion unit 2 such that the main thrust of the main engine 3 determined for the first operating condition corresponds to the maximal thrust likely to be achieved by the main engine 3 irrespective of the operating condition.

The auxiliary engine 4 can provide thrust continuously between the first and the second operating condition, or as a variant be halted during one at least of said operating conditions.

In the rest of this description the first operating condition of the propulsion unit 2 corresponds to take off while the second operating condition corresponds to top of climb. Typically, for an engine having a rotation speed redline of low-pressure parts between 3000 rpm (revolutions per minute) and 4000 rpm, take off corresponds to a rotation speed of the low-pressure shaft between 2500 and 3000 rpm, while the top of climb corresponds to a rotation speed of the low-pressure shaft between 3000 rpm and 3500 rpm. Also, the propulsion unit 2 can have additional operating conditions such as inter alia cruise, idle (ground and flight), etc.

The choice of these operating conditions for the rating of the propulsion unit is not limiting however, the process of the invention being adapted to be applied to a propulsion unit 2 on the basis of other operating conditions of said propulsion unit 2.

FIG. 1 is a graphic illustrating, on the Y-axis, the proportion (percentage) of the total thrust of the propulsion unit 2 made by a main engine 3 at take off and, on the axis of abscissa, the proportion (percentage) of this total thrust produced by the auxiliary engine 4 at top of climb. All the points present on the curve represented correspond to rating points possible for the propulsion unit 2 and improving the specific consumption of said assembly 2.

It is evident that FIG. 1 illustrates thrust ratios in maximal rating conditions but in no way prejudges the way in which the main engines 3 and auxiliary engines 4 will be used later. In fact, once the main engine 3 and the auxiliary engine 4 of the propulsion unit 2 are rated, it is possible to utilise these engines 3, 4 at thrusts lower than these maximal thrusts.

The choice of a point on the curve, and therefore the rating of a given propulsion unit 2, can be determined as a function of the type of aircraft 1 and of the type of associated mission (short-, medium-, long-haul, etc.). Typically, for an aircraft 1 configured to carry out a mission of long-haul type, the proportion of the auxiliary thrust in the second split is preferably greater than in the case of an aircraft 1 configured to carry out a mission of short-haul type. In fact, the flight time in cruise is shorter on a short-haul than on a long-haul, such that it can be preferable to improve the thermodynamic yield of the propulsion unit 2 at top of climb and to limit the bulk and weight of the auxiliary engine 4 rather than improve its thermodynamic yield in cruise and increase the bulk and weight of the auxiliary engine 4.

In the following, the percentages of split of the thrust during a given operating condition provided by the main engine 3 and the auxiliary engine 4 are indicated close to 2%, this tolerance corresponding to the possible variations for the choice of the rating compression ratio of the fan of the main engine 3. Typically, the compression ratio of the fan of the main engine 3 can be between 1.2 and 1.7, preferably between 1.3 and 1.6, for example of the order of 1.45 to 1.5.

It is clear that the compression ratio of the fan is determined here when the main engine 3 is stationary in a standard atmosphere (such as defined by the manual of the International Civil Aviation Organisation (ICAO), Doc 7488/3, 3rd edition) and at sea level.

The propulsion unit 2 can be rated such that the thrust provided by said propulsion unit 2 during the take off operating condition is obtained at 45% at most by the auxiliary engine 4, the complement being contributed by the main engine 3, while only the main engine 3 provides the necessary thrust during the top of climb operating condition. This configuration corresponds to the section of the curve extending between the points A (corresponding to 95% of main thrust, 5% of auxiliary thrust at take off and 100% of main thrust at top of climb) and B (corresponding to 58% of main thrust, 42% of auxiliary thrust at take off and 100% of main thrust at top of climb) of the curve illustrated in FIG. 1.

In this configuration, the auxiliary engine 4 therefore participates in thrust during the take off operating condition only.

Such a rating of the propulsion unit 2 improves the specific consumption of the main engine 3 by comparison with a conventional engine (that is, an engine rated from the take off operating condition and which has no auxiliary engine), especially in the top of climb and cruise operating conditions, to the extent where the main engine 3 is rated from a main maximal thrust (at take off) which is lower.

As a variant, the propulsion unit 2 can be rated such that the thrust provided by said propulsion unit 2 is obtained at 45% to 48% by the auxiliary engine 4 during the take off operating condition and at 0% to 20% during the top of climb operating condition, the complement in each operating condition being contributed by the main engine 3. This configuration corresponds to the section extending between the points B and C (corresponding to 52% of main thrust and 48% of auxiliary thrust at take off, and 80% of main thrust and 20% of auxiliary thrust at top of climb) of the curve illustrated in FIG. 1.

In this configuration, the auxiliary engine 4 therefore participates in thrust both during the take off operating condition and during the top of climb operating condition.

As a variant, the propulsion unit 2 can be rated such that the thrust provided by said propulsion unit 2 is obtained at 48% to 55% by the auxiliary engine 4 during the take off operating condition and at 20% to 35% during the top of climb operating condition, the complement in each operating condition being contributed by the main engine 3. This configuration corresponds to the section extending between the points C and D (corresponding to 45% of main thrust and 55% of auxiliary thrust at take off, and 65% of main thrust and 35% of auxiliary thrust at top of climb) of the curve illustrated in FIG. 1.

In this configuration, the auxiliary engine 4 therefore participates in thrust both during the take off operating condition and during the top of climb operating condition.

As a variant, the propulsion unit 2 can be rated such that the thrust provided by said propulsion unit 2 is obtained at 55% and 63% by the auxiliary engine 4 during the take off operating condition and at 35% to 50% during the top of climb operating condition, the complement in each operating condition being contributed by the main engine 3. This configuration corresponds to the section extending between points D and E (corresponding to 37% of main thrust and 63% of auxiliary thrust at take off, and 50% of main thrust and 50% of auxiliary thrust at top of climb) of the curve illustrated in FIG. 1.

In this configuration, the auxiliary engine 4 therefore participates in thrust both during the take off operating condition and during the top of climb operating condition.

As a variant, the propulsion unit 2 can be rated such that the thrust provided by said propulsion unit 2 is obtained at 63% and 70% by the auxiliary engine 4 during the take off operating condition and at 50% to 60% during the top of climb operating condition, the complement in each operating condition being contributed by the main engine 3. This configuration corresponds to the section extending between the points E and F (corresponding to 30% of main thrust and 70% of auxiliary thrust at take off, and 40% of main thrust and 60% of auxiliary thrust at top of climb) of the curve illustrated in FIG. 1.

In this configuration, the auxiliary engine 4 therefore participates in thrust both during the take off operating condition and during the top of climb operating condition.

In a first embodiment, the propulsion unit 2 can be rated such that, during the take off operating condition, the thrust provided by the propulsion unit 2 is obtained at 38% to 42% by the auxiliary engine 4 during the take off operating condition (the complement being provided by the main engine 3) and at 100% by the main engine 3 during the top of climb operating condition.

This first embodiment is particularly adapted for the aircraft 1 having a mission of short-haul type. In fact, the thermodynamic cycle of the main engine 3 is optimised at top of climb, which improves its specific consumption in comparison with a conventional engine, especially in the operating conditions of top of climb and cruise, without as such needing a large-size auxiliary engine 4, reducing the bulk of the propulsion unit 2 as well as the overload resulting from the addition of an auxiliary engine 4.

In a second embodiment, the propulsion unit 2 can be rated such that the thrust provided by the propulsion unit 2 is obtained at 47% to 49% by the auxiliary engine 4 during the take off operating condition and at 18% to 21% by the auxiliary engine 4 during the top of climb operating condition, the rest of the thrust being provided by the main engine 3.

This second embodiment is particularly adapted for the aircraft 1 having a mission of short-haul to medium-haul type. In fact, the thermodynamic cycle of the main engine 3 is improved at top of climb and optimised to the point of maximal corrected engine speed of the fan (N1K), which corresponds to an intermediate operating condition between the top of climb operating condition and the operating cruise condition which is representative of the average use of the plane on this type of mission.

Typically, the specific consumption of a propulsion unit 2 rated in keeping with this embodiment is further reduced relative to that of the propulsion unit 2 according to the first embodiment. The diameter of the auxiliary engine 4 is larger, however.

In a third embodiment, the propulsion unit 2 can be rated such that the thrust provided by the propulsion unit 2 is obtained at 52% to 55% by the auxiliary engine 4 during the take off operating condition and at 33% to 36% by the auxiliary engine 4 during the top of climb operating condition, the rest of the thrust being provided by the main engine 3.

This third embodiment is particularly adapted for the aircraft 1 having a mission of the medium-haul to long-haul type. In fact, the thermodynamic cycle of the main engine 3 is improved at top of climb and optimised at the point of engine speed of the fan corresponding to 95% of its corrected maximal speed which corresponds to an operating condition of start of cruise of average length, representative of the average use of the plane on this type of mission.

Typically, the specific consumption of a propulsion unit 2 rated in keeping with this third embodiment is further reduced relative to that of the propulsion unit 2 according to the second embodiment. The diameter of the auxiliary engine 4 is larger, however.

In a fourth embodiment, the propulsion unit 2 can be rated such that the thrust provided by the propulsion unit 2 is obtained by the auxiliary engine 4 at 60% to 63% during the take off operating condition and at 49% to 52% during the top of climb operating condition, the rest of the thrust being provided by the main engine 3.

This fourth embodiment is particularly adapted for aircraft having a mission of long-haul type. In fact, the thermodynamic cycle of the main engine 3 is improved at top of climb and optimised at the point of engine speed of the fan corresponding to 90% of its corrected maximal speed which corresponds to an operating condition of long-length cruise medium, representative of the average use of the plane on this type of mission.

Typically, the specific consumption of a propulsion unit 2 rated in keeping with this fourth embodiment is further reduced relative to that of the propulsion unit 2 according to the third embodiment. The diameter of the auxiliary engine 4 is larger, however.

The propulsion unit 2 can comprise one or more main engines 3 and one or more auxiliary engines 4. In this case, the main engine or the main engines 3 jointly participate in providing the main thrust, while the auxiliary engine or the auxiliary engines 4 jointly participate in providing the auxiliary thrust.

The main engine or the main engines 3 can comprise one or more turbojets and/or one or more turboprops, said main engines 3 able to comprise at least one ducted or non-ducted fan/propeller.

The or the auxiliary engines 4 can comprise one or more turbojets and/or one or more turboprops and/or one or more propulsion effectors with electric engines. Where appropriate, the auxiliary engine or the auxiliary engines 4 can be retractable, that is, their position can be modified during some phases of the flight of the aircraft 1 to minimise their drag. For example, the auxiliary engines 4 can be retracted by being returned to a specific hold formed in the wings of the aircraft 1.

For example, the propulsion unit 2 can comprise one main engine 3 and two auxiliary engines 4. The auxiliary engines 4 can for example be fixed under the wings of an aircraft 1 while the main engine 3 can be placed to the rear of the fuselage of the aircraft 1, as illustrated in FIG. 2.

Typically, the propulsion unit 2 can comprise a turboprop with non-ducted propeller and two auxiliary engines 4 each comprising one or more propulsion effectors (such as a fan) driven by an electric engine.

The invention claimed is:

1. A process for rating a propulsion unit for an aircraft, the propulsion unit comprising at least one main engine and at least one auxiliary engine distinct from the at least one main engine, the at least one main engine configured to provide main thrust, the at least one auxiliary engine configured to provide auxiliary thrust, the process comprising:
determining a first distribution between the main thrust and the auxiliary thrust to obtain a first thrust of the propulsion unit in a first operating condition, the auxiliary thrust selected to be at least 5% and at most 65% of the first thrust such that, when the propulsion unit is operating in the first operating condition, the propulsion unit provides the first thrust that includes the first distribution between the main thrust and the auxiliary thrust;
determining a second distribution between the main thrust and the auxiliary thrust to obtain a second thrust of the propulsion unit in a second operating condition, the second distribution being a function of the first distribution, the auxiliary thrust selected to be at most 70% of the second thrust, such that when the propulsion unit is operating in the second operating condition, the propulsion unit provides the second thrust in the second distribution between the main thrust and the auxiliary thrust;

rating the propulsion unit based on the first distribution and the second distribution such that the determined main thrust of the at least one main engine for the first operating condition is a maximum thrust of the at least one main engine; and manufacturing the propulsion unit based on the rating.

2. The process according to claim 1, wherein determining the first distribution between the main thrust and the auxiliary thrust and determining the second distribution between the main thrust and the auxiliary thrust comprises:

selecting the auxiliary thrust to be 45% of the first thrust in the first operating condition and selecting the main thrust to be 100% of the second thrust in the second operating condition, or selecting the auxiliary thrust to be from 45% to 48% of the first thrust in the first operating condition and selecting the auxiliary thrust to be from 0% to 20% of the second thrust in the second operating condition, or selecting the auxiliary thrust to be from 48% to 55% of the first thrust in the first operating condition and selecting the auxiliary thrust to be from 20% to 35% of the second thrust in the second operating condition, or selecting the auxiliary thrust to be from 55% to 63% of the first thrust for the first operating condition and selecting the auxiliary thrust to be from 35% to 50% of the second thrust in the second operating condition, or selecting the auxiliary thrust to be from 63% to 70% of the first thrust in the first operating condition and selecting the auxiliary thrust to be from 50% to 60% of the second thrust in the second operating condition, wherein the foregoing ranges are selected within a 2% margin of error.

3. The process according to claim 1, wherein determining the first distribution between the main thrust and the auxiliary thrust and determining the second distribution between the main thrust and the auxiliary thrust comprises:

selecting the auxiliary thrust to be from 38% to 42% of the first thrust in the first operating condition and selecting the main thrust to be 100% of the second thrust in the second operating condition, or selecting the auxiliary thrust to be from 47% to 49% of the first thrust in the first operating condition and selecting the auxiliary thrust to be from 18% to 21% of the second thrust in the second operating condition, or selecting the auxiliary thrust to be from 52% to 55% of the first thrust in the first operating condition and selecting the auxiliary thrust to be from 33% to 36% of the second thrust in the second operating condition, or selecting the auxiliary thrust to be from 60% to 63% of the first thrust in the first operating condition and selecting the auxiliary thrust to be from 49% to 52% of the second thrust in the second operating condition, wherein the foregoing ranges are selected within a 2% margin of error.

4. The process according to claim 1, wherein the first operating condition is a take-off operating condition and the second operating condition is a top of climb operating condition.

5. A propulsion unit for an aircraft comprising:

at least one main engine comprising a fan with a first compression ratio, the at least one main engine configured to provide main thrust, the first compression ratio of the fan of the at least one main engine is set such that the main thrust of the at least one main engine determined for a first operating condition corresponds to a maximum thrust of the at least one main engine; and at least one auxiliary engine distinct from the at least one main engine, the at least one auxiliary engine comprising a fan with a second compression ratio, and the at least one auxiliary engine configured to provide auxiliary thrust, wherein the at least one main engine and the at least one auxiliary engine are configured to provide a first combination of the main thrust in a first operating condition and the auxiliary thrust and configured to provide a second combination of the main thrust and the auxiliary thrust in a second operating distribution, wherein in the first combination, the auxiliary thrust provides at least 5% and at most 65% of a first thrust when the propulsion unit is operated in the first operating condition to provide the first thrust, and in the second distribution, the auxiliary thrust provides at most 70% of a second thrust of the propulsion unit when the propulsion unit is operated in the second operation condition to provide the second thrust, wherein the propulsion unit is manufactured to provide the first combination and the second combination.

6. The propulsion unit according to claim 5, wherein the at least one main engine comprises one or more turbojets and/or one or more turboprops.

7. The propulsion unit according to claim 5, wherein the at least one auxiliary engine comprises one or more turbojets and/or one or more turboprops and/or one or more propulsion effectors with electric engines.

8. The propulsion unit according to claim 5, wherein the at least one auxiliary engine is retractable.

9. An aircraft comprising the propulsion unit according to claim 5.

10. The aircraft according to claim 9, wherein the propulsion unit comprises at least two auxiliary engines, and wherein a combined thrust of the at least two auxiliary engines comprises 100% of the auxiliary thrust.

11. The process according to claim 1, wherein a rating value of the propulsion unit falls on a curve of a percentage of a take-off thrust of the propulsion unit made by the at least one main engine as a function of a percentage of a total thrust of the propulsion unit taken by the at least one auxiliary engine at the top of climb operating condition.

12. The process according to claim 1, wherein rating the propulsion unit further comprises rating the propulsion unit based on a type of aircraft on which the propulsion unit is provided.

13. The process according to claim 12, wherein the type of the aircraft comprises a short-haul type aircraft, a short-haul to medium-haul type aircraft, a medium-haul to long-haul type aircraft, and a long-haul type aircraft.

14. The process according to claim 13, wherein a rating value of the propulsion unit falls on a curve of a percentage of a take-off thrust of the propulsion unit provided by the at least one main engine as a function of a percentage of a total thrust of the propulsion unit provided by the at least one auxiliary engine at a top of climb operating condition.

* * * * *